(12) United States Patent
Cook et al.

(10) Patent No.: US 10,255,919 B2
(45) Date of Patent: *Apr. 9, 2019

(54) IDENTIFYING SPEAKER ROLES IN A STREAMING ENVIRONMENT

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,188

(22) Filed: Nov. 8, 2017

(65) Prior Publication Data
US 2018/0336899 A1 Nov. 22, 2018

Related U.S. Application Data

(63) Continuation of application No. 15/598,409, filed on May 18, 2017.

(51) Int. Cl.
*G10L 15/00* (2013.01)
*G10L 15/26* (2006.01)
(Continued)

(52) U.S. Cl.
CPC .......... *G10L 15/265* (2013.01); *G06F 17/279* (2013.01); *G10L 15/22* (2013.01);
(Continued)

(58) Field of Classification Search
CPC combination set(s) only.
See application file for complete search history.

(56) References Cited

U.S. PATENT DOCUMENTS

2014/0074467 A1* 3/2014 Ziv .................. G10L 25/78
704/235
2014/0177482 A1* 6/2014 Crinon ............. H04M 3/569
370/260

(Continued)

OTHER PUBLICATIONS

Cook et al., "Identifying Speaker Roles in a Streaming Environment" U.S. Appl. No. 15/598,409, filed May 18, 2017.

(Continued)

*Primary Examiner* — Vu B Hang
(74) *Attorney, Agent, or Firm* — Martin & Associates, LLC; Bret J. Petersen

(57) ABSTRACT

A streams controller monitors multiple data streams with speech of a conversation with multiple speakers and uses text analytics and diaritization to identify speakers by their role in the conversation. Diaritization is applied to the audio of a data stream to associate a speaker with an SSRC from the data stream and a speaker identification (ID). The streams controller then runs text analytics on a text version of the speaker's speech to determine a speaker role for the speaker. The speaker role can be used to efficiently monitor conversations in a data stream to provide additional services. For example, speaker role can be used to analyze calls in a call center and provide services such as a transcript of conversations or enhanced customer support.

7 Claims, 6 Drawing Sheets

(51) Int. Cl.
*G06F 17/27* (2006.01)
*G10L 15/28* (2013.01)
*G10L 15/22* (2006.01)
*H04L 29/06* (2006.01)
*H04M 7/00* (2006.01)
*G10L 15/08* (2006.01)

(52) U.S. Cl.
CPC .......... *G10L 15/285* (2013.01); *H04L 65/608* (2013.01); *G10L 15/08* (2013.01); *H04M 7/006* (2013.01)

(56) References Cited

U.S. PATENT DOCUMENTS

2016/0179831 A1* 6/2016 Gruber .................... G10L 15/26
704/235
2016/0217793 A1 7/2016 Gorodetski et al.

OTHER PUBLICATIONS

IBM, Appendix P—List of IBM Patents or Patent Applications Treated As Related, dated Feb. 1, 2018.

* cited by examiner

| Role | Terms and Phrases (Text Analytics) |
|---|---|
| Agent | "help you", "your problem", "Hi, this is xxxx, could I please get your name", "thank you for calling" |
| Customer | "my computer", "my problem", "my account number is xxxx", a long explanation at the beginning of the call |

IDENTIFYING SPEAKER ROLES IN A STREAMING ENVIRONMENT

BACKGROUND

1. Technical Field

This disclosure generally relates to diaritization used in a streaming environment, and more specifically relates to a system and method for using diaritization and text analytics in a streaming environment to identify speaker roles in conversations within a data stream.

2. Background Art

Diaritization derives from 'diary' or the recording of past events. Speaker diaritization refers to methods and algorithms used to identify, segment and cluster speech from an input audio stream according to the speaker. Speaker diaritization seeks to find speaker change points in an audio stream and then group together speech segments on the basis of speaker characteristics. Speaker diaritization has been used to enhance the readability of automatic speech transcription by structuring the audio stream into speaker turns.

Voice data is often sent as a data stream using real-time transport protocol (RTP). RTP provides end-to-end network transport functions suitable for applications transmitting real-time data, such as audio, video or simulation data, over multicast or unicast network services. The data transport is augmented by a control protocol (RTCP) to allow monitoring of the data delivery in a manner scalable to large multicast networks, and to provide minimal control and identification functionality. The control protocol specifies that a packet of RTP data include a synchronization source identifier (SSRC) that uniquely identifies the synchronization source within an RTP session. RTP data streams also have control packets. However, the control packets vary depending on the RTP traffic environment and hardware infrastructure.

BRIEF SUMMARY

A streams controller monitors multiple data streams with speech of a conversation with multiple speakers and uses text analytics and diaritization to identify speakers by their role in the conversation. Diaritization is applied to the audio of a data stream to associate a speaker with an SSRC from the data stream and a speaker identification (ID). The streams controller then runs text analytics on a text version of the speaker's speech to determine a speaker role for the speaker. The speaker role can be used to efficiently monitor conversations in a data stream to provide additional services. For example, speaker role can be used to analyze calls in a call center and provide services such as a transcript of conversations or enhanced customer support. The streams controller may process only the RTP data packets and not RTP control packets to increase portability of the streams controller.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for a streams controller that monitors multiple data streams with speech of a conversation with multiple speakers and uses text analytics and diaritization to identify speakers by their role in the conversation. Diaritization is applied to the audio of a data stream to associate a speaker with an SSRC from the data stream and a speaker identification (ID). The streams controller then runs text analytics on a text version of the speaker's speech to determine a speaker role for the speaker. The speaker role can be used to efficiently monitor conversations in a data stream to provide additional services. For example, speaker role can be used to analyze calls in a call center and provide services such as a transcript of conversations or enhanced customer support.

Figure 1:
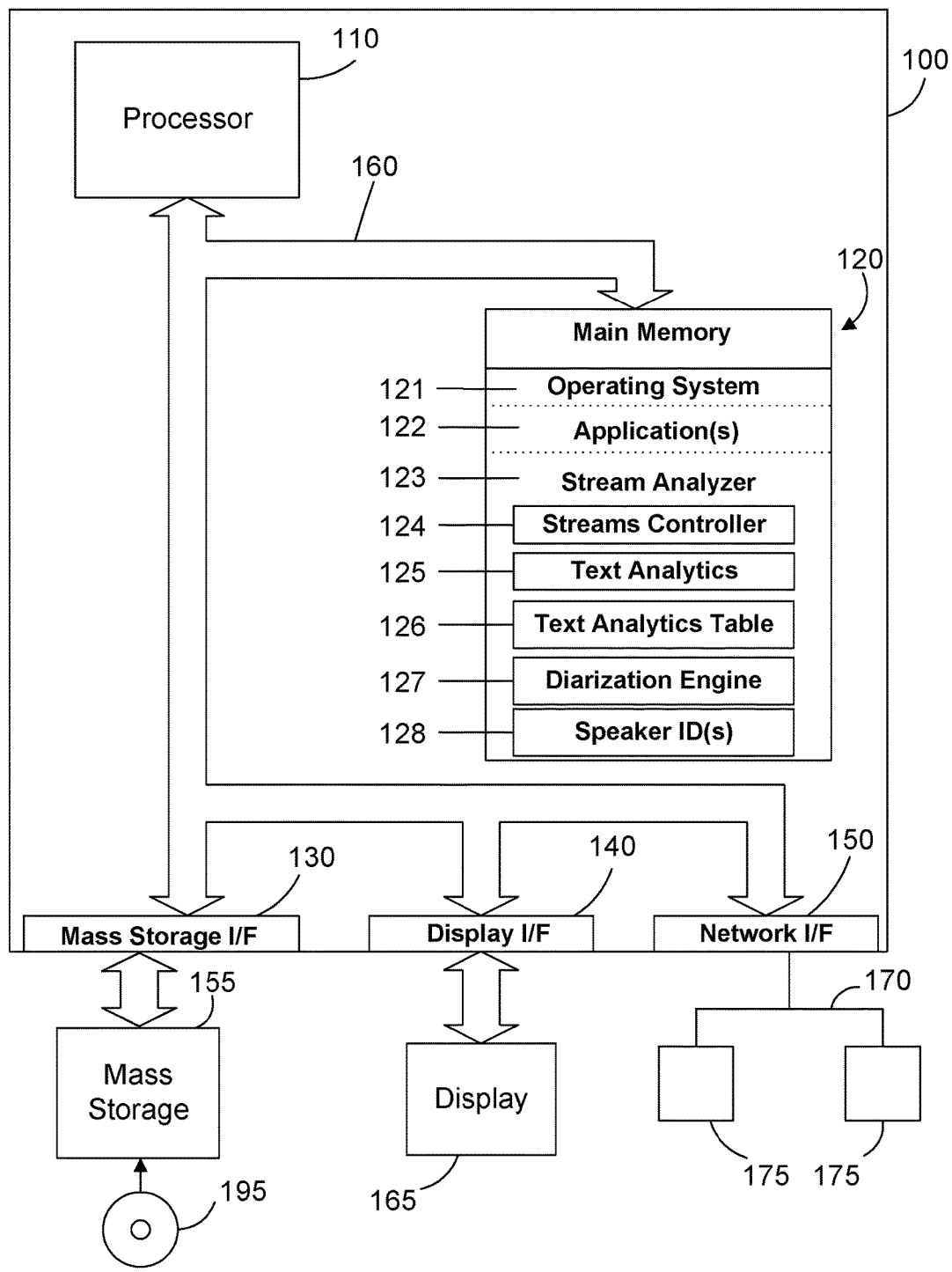
FIG. 1 is a block diagram a computer system with a streams controller that monitors multiple data streams and uses text analytics and diaritization to identify speakers by their role in the conversation.

Referring to FIG. 1, a computer system 100 is one suitable implementation of a system that is capable of performing the computer operations described herein including with a streams controller that monitors multiple data streams and uses text analytics and diaritization to identify speakers by their role in the conversation. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes one or more applications 122. The memory 120 also includes a stream analyzer 123 that includes a streams controller 124, text analytics 125, a text analytics table 126, a diaritization engine 127 and speaker ID(s) 128. The stream analyzer 123 and its components are described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, applications 122, stream analyzer 123, streams controller 124, text analytics 125, text analytics table 126, diaritization engine 127 and speaker ID(s) 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the applications 122 and the stream analyzer 123 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
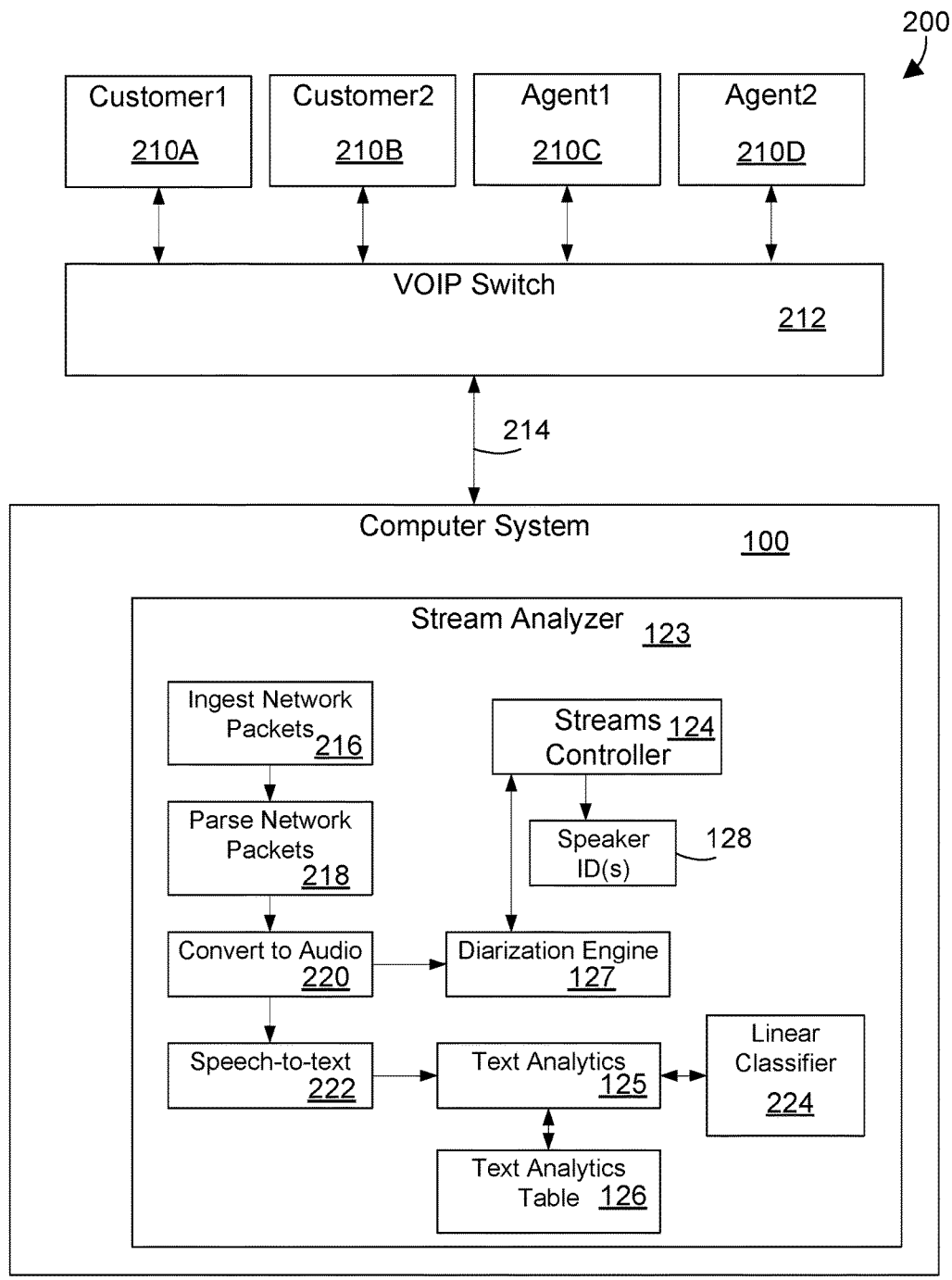
FIG. 2 illustrates another simplified block diagram of a system with a stream analyzer with a streams controller that monitors multiple data streams and uses text analytics and diaritization to identify speakers by their role in the conversation.

FIG. 2 illustrates a simplified example of a system 200 for analyzing data streams. System 200 includes a computer system 100 described above with reference to FIG. 1. The system 200 provides voice communication connections to multiple callers or into the system. In this example, the callers 210 include customer1 210A, customer2 210B, agent1 210C and agent2 210D which are collectively referred to as callers 210. The callers 210 are also the speakers as described below. The system 200 connects the callers 210 over a voice over internet (VOIP) switch 212. The VOIP switch 212 provides data streams 214 to the computer system 100 for analysis as described below. The VOW switch of system 200 illustrated in FIG. 2 represents voice communication equipment as known in the prior art to connect multiple user such as users 210 and provide the data stream 214 which includes RTP data streams for the communication as described below. An example of a VOIP switch 212 is a voice communication system used in a data call center to take calls from customers as described in the examples below.

Again referring to FIG. 2, the computer system 100 includes the stream analyzer 123 introduced above. The stream analyzer 123 is a software module on the computer system 100 that analyzes the data streams 214 as described herein. The stream analyzer 123 includes a streams controller 124 that controls the stream analyzer and provides the functions described below. The stream analyzer 123 includes functional blocks to ingest network packets 216, packet parsing 218, audio conversion 220 and speech-to-text 222. The stream analyzer further includes text analytics 125, text analytics table 126, the diaritization engine 127 and a linear classifier 224. The stream analyzer ingests network packets 216 from data streams 214 received from the VOIP switch 212. The stream analyzer then parses the network packets 218 to assemble the packets for each audio stream within the data stream. The assembled packets for the audio streams are then converted to audio 220. The audio is then sent to the speech-to-text block 222 to get a text transcript for the audio streams. The audio is also sent to the diaritization engine 127 to identify the speaker as described further below. The blocks 216, 218, 220, 222 and 127 operate in a manner similar to the prior art and are used by the streams controller as described below. The speech-to-text block 222 provides the text transcript for the audio streams to a text analytics block 125. The text analytics block 125 uses the text transcript to identify a role for a speaker (a caller 210) identified by a speaker role or SSRC as described further below. The text analytics block 125 may use the text analytics table 126 and/or the linear classifier 224 as described below.

Figures 3, 4:
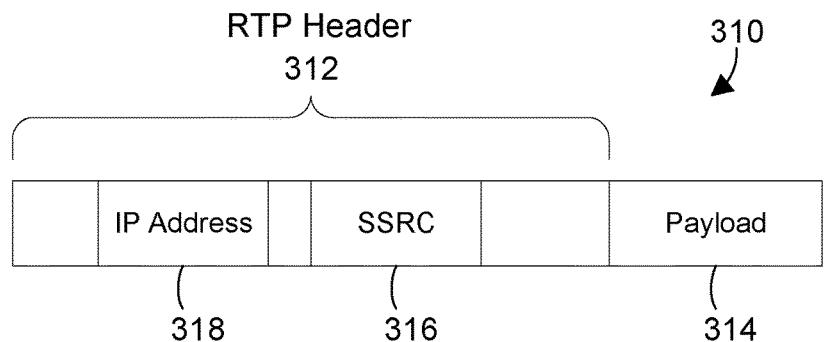
FIG. 3 illustrates a simplified view of an RTP data packet.
FIG. 4 illustrates a table of text analytic terms used to identify the role of a speaker.

FIG. 3 illustrates a simplified view of a real-time transport protocol (RTP) data packet 310. An RTP data packet 310 is used to transmit data such as a telephone conversation in a data stream in the manner known in the prior art. The RTP data packet 310 includes an RTP header 312 and a payload 314. The header 312 includes control information and the payload includes the data being transmitted in the packet such as audio or video data. The header 312 includes a synchronization source identifier (SSRC) 316 that uniquely identifies a synchronization source within an RTP session. The header 312 may also contain an internet protocol (IP) address 318 that can be used to tie together multiple SSRCs of a single conversation. There may be one or more speakers on a data stream from a source identified by a unique SSRC. In many cases there is a single speaker and in this case the SSRC can be used to identify the speaker as described further below. As mentioned in the background section, RTP data streams also have control packets. However, the control packets vary depending on the RTP traffic environment and hardware infrastructure. In order to increase portability of the streams controller to other hardware and software environments, the streams controller may process only the RTP data packets and not RTP control packets. In the examples herein, the streams controller processes only the RTP data packets in the RTP data stream.

Again referring to FIG. 2, the diaritization engine 127 uses known diaritization techniques to identify a speaker in an RTP stream. The identified speaker or speakers in the RTP stream have an associated SSRC. The speaker may also be given a speaker ID as described below. The streams controller uses text analytics and diaritization to identify speakers with a given speaker ID by their role in the conversation. For example, the streams controller may monitor multiple RTP data streams having speakers with unknown speaker roles. The streams controller can use the SSRC within each packet to identify a channel within a given call. All the channels of a conversation or call can be tied together using an internet protocol (IP) address within the RTP packet. Typically each SSRC would be associated with a single speaker or caller, however, in some cases multiple voices or speakers may be found within a single SSRC. Diaritization can be used to identify multiple speakers within a single SSRC. Text analytics and diaritization can then be used in combination to identify speakers in the RTP streams by their role. Once a role is identified, the streams controller can continue to monitor transcription of the continued RTP stream and identify the speaker role by the associated SSRC or a speaker ID from diaritization as described further below.

As introduced above, the streams controller uses text analytics and diaritization to identify speakers in the RTP streams by their role. Some phone calls may have multiple speakers. For example, in a phone call to a call center there may be more than one agent (speakers) on the call in addition to at least one customer (also a speaker). Diaritization can be used to identify and separate the speech of the different agents and then text analytics can be used to identify the role of all speakers on the call. For example, diaritization is first used to associate a speaker or speakers in an RTP stream with a given SSRC with a unique speaker ID for each speaker. Text analytics can then be run over a text transcription of each RTP stream to classify each speaker with a given speaker ID to a speaker role. Methods of text analytics are described further below. The streams controller can repeat the above as new live transcriptions become available to increase confidence in the speaker role classification.

Diaritization typically takes a large amount of computer resources. It would be advantageous if diaritization could be turned off when it is not needed. The diaritization engine typically needs ten to twenty seconds of speech to accurately identify the speaker. After the speaker is identified, the diaritization may optionally be able to be turned off in some circumstances. For example, if it is determined that there is only a single agent and a single customer on the call, then future speech on the call could be identified by the SSRC. This is possible since there would be a unique SSRC for each speaker. If there is only a single speaker for a location, then there is a one-to-one correspondence between the speaker ID and the SSRC for the call. In this case, diaritization could optionally be turned off and the role of the speakers continued using the SSRC of the RTP streams.

Knowing the role of a speaker in a conversations in a data stream can be used in various ways. For example, in a call center environment the role of the speaker can be used to provide additional services and enhance customer support. In one example, the role of a speaker could be used with text analytics to monitor customer satisfaction. Generally a call center agent will remain quite positive, which can make the calculated sentiment of a call seem quite positive, even if the customer calling is using quite negative/neutral language. Using the speaker role to identify speech of the customer enables the system to focus on the customer's language which allows a much more accurate assessment of customer satisfaction. Similarly, using the speaker role to focus on speech of just the agent could ensure analytics run on the conversation accurately assesses whether the agent is maintaining a positive tone with customers.

Another way the speaker role can be used is to monitor compliance. In a call-center there are many issues and needs for ensuring compliance with rules or laws. The issue of compliance involves an agent's responsibility to inform the caller of certain options, as well as follow certain formats of question/response. In cases of the financial industry or utilities, this can even be required by law. Identifying agent speech using the identified role of the speaker may be used to ensure compliance to these rules and laws. For example, an agent may be required to ask caller interested in annuities if they are smokers. If the agent fails to ask, the caller may say "I am a smoker, does that affect my annuity?" Detecting this statement by a speaker in the call with a customer role could be used to alert a breach in compliance where the agent didn't proactively ask a question as they are required.

FIG. 4 illustrates a table 400 with examples of terms and phrases 410 used for text analytics and their associated speaker role 412. The terms and phrases 410 and their associated speaker roles 412 may be used by the text analytics block 125 in FIG. 2 as one method of using text analytics in combination with speaker diaritization to identify the role of a speaker in a conversation within a stream of data. In this example, the roles are "Agent" 414 and "Customer" 416. In this example, the terms and phrases 418 for "Agent" 414 are compiled from common terms or phrases an agent in a call center may speak during a conversation on a call such as by telephone or other communication system. Similarly, the terms and phrases 420 for "Customer" 416 are common terms or phrases that would be used by a customer calling a call center such as a help line or customer service center. The terms and phrases in table 400 could be adjusted depending on the application. A small sample of possible terms and phrases are given here for a simple example. The table 400 with the terms and phrases 410 and their associated speaker roles 412 may be used to classify each speaker with a given speaker ID to a speaker role. The text analytics block compares the terms and phrases used by a speaker with a given speaker ID to the terms and phrases 410 in the table 400. The speaker can then be classified with a speaker role where terms and phrases spoken match terms and phrases for a speaker role in the table.

Another method of using text analytics to classify a speaker role in conjunction with diaritization incorporates a linear classifier 224 as shown in FIG. 2. Linear classifiers are known in the prior art to use an object's characteristics to identify which class (or group) the object belongs to. As used herein, the linear classifier can be used to identify speaker roles from transcribed text. The linear classifier 224 learns from example transcribed text to create a model. An example of transcribed text may be created by transcribing an example audio stream with multiple speakers and roles. The speaker roles are then manually assigned to the example text for each speaker. The example of transcribed text and manually assigned speaker roles is then input to a linear classifier so the linear classifier can learn a model for assigning speaker roles. The model can then be tested for accuracy and run additional transcriptions can be processed if needed to build an effective linear classifier model.

Figure 5:
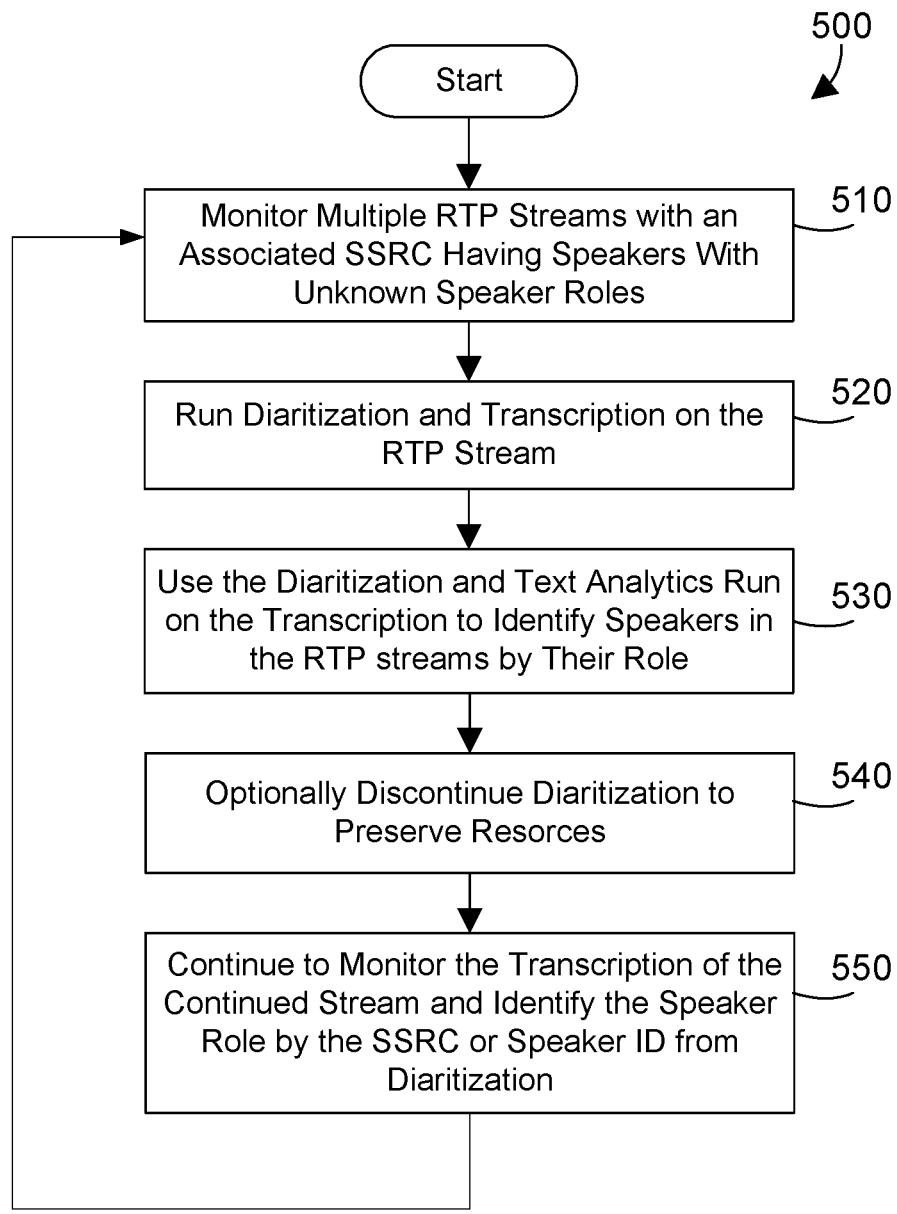
FIG. 5 is a flow diagram of a method for monitoring multiple data streams and using text analytics and diaritization to identify speakers by their role in the conversation.

Referring to FIG. 5, a method 500 shows one suitable example for using text analytics and diaritization to identify speakers by their role in the conversation. Portions of method 500 are preferably performed by stream analyzer 123 and the streams controller 124 shown in FIG. 2. First, monitor multiple RTP data streams having speakers with unknown speaker roles where each RTP stream has an associated SSRC (step 510). Next, run diaritization on the RTP streams to identify speakers and run transcription on the RTP streams to output text corresponding to speech of the speakers (step 520). Use text analytics and diaritization to identify speakers in the RTP streams by their role (step 530). Optionally discontinue diaritization to preserve computer resources (step 540). Continue to monitor transcription of the continued RTP stream and identify the speaker role by the SSRC or speaker ID from diaritization (step 550). Method 500 may then continue by returning to step 510.

Figure 6:
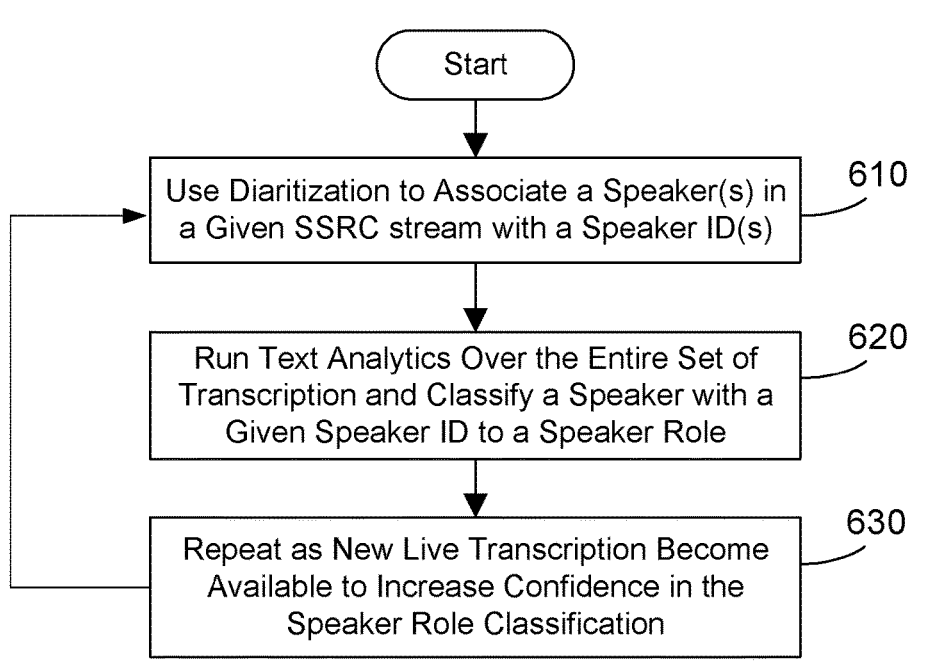
FIG. 6 is a flow diagram of a specific method for step 530 in FIG. 5.

FIG. 6 shows one suitable example of a method 600 to use text analytics and diaritization to identify speakers in the RTP streams by their role. Method 600 thus shows a suitable method for performing step 530 in method 500 in FIG. 5. First, use diaritization to associate a speaker or speakers in an RTP stream with a given SSRC with a unique speaker ID for each speaker (step 610). Run text analytics over the entire set of transcriptions for each RTP stream and classify each speaker with a given speaker ID to a speaker role (step 620). Return to step 610 and repeat as new live transcriptions become available to increase confidence in the speaker role classification (step 630). Method 600 may then continue by returning to step 610.

Figure 7:
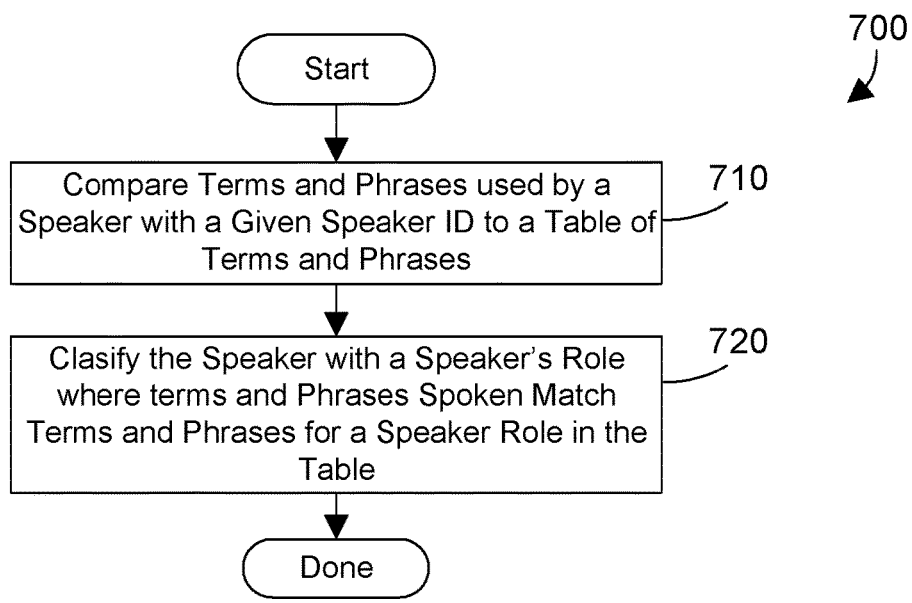
FIG. 7 is a flow diagram of a specific method for step 620 in FIG. 6.

FIG. 7 shows one suitable example of a method 700 to run text analytics over an entire set of transcriptions for each RTP stream and classify each speaker with a given speaker ID to a speaker role. Method 700 thus shows a suitable method for performing step 620 in method 600 in FIG. 6. First, compare terms and phrases used by a speaker with a given speaker ID to a table of terms and phrases (step 710). Classify the speaker with a speaker role where terms and phrases spoken match terms and phrases for a speaker role in the table (step 720). Method 700 is then done.

Figure 8:
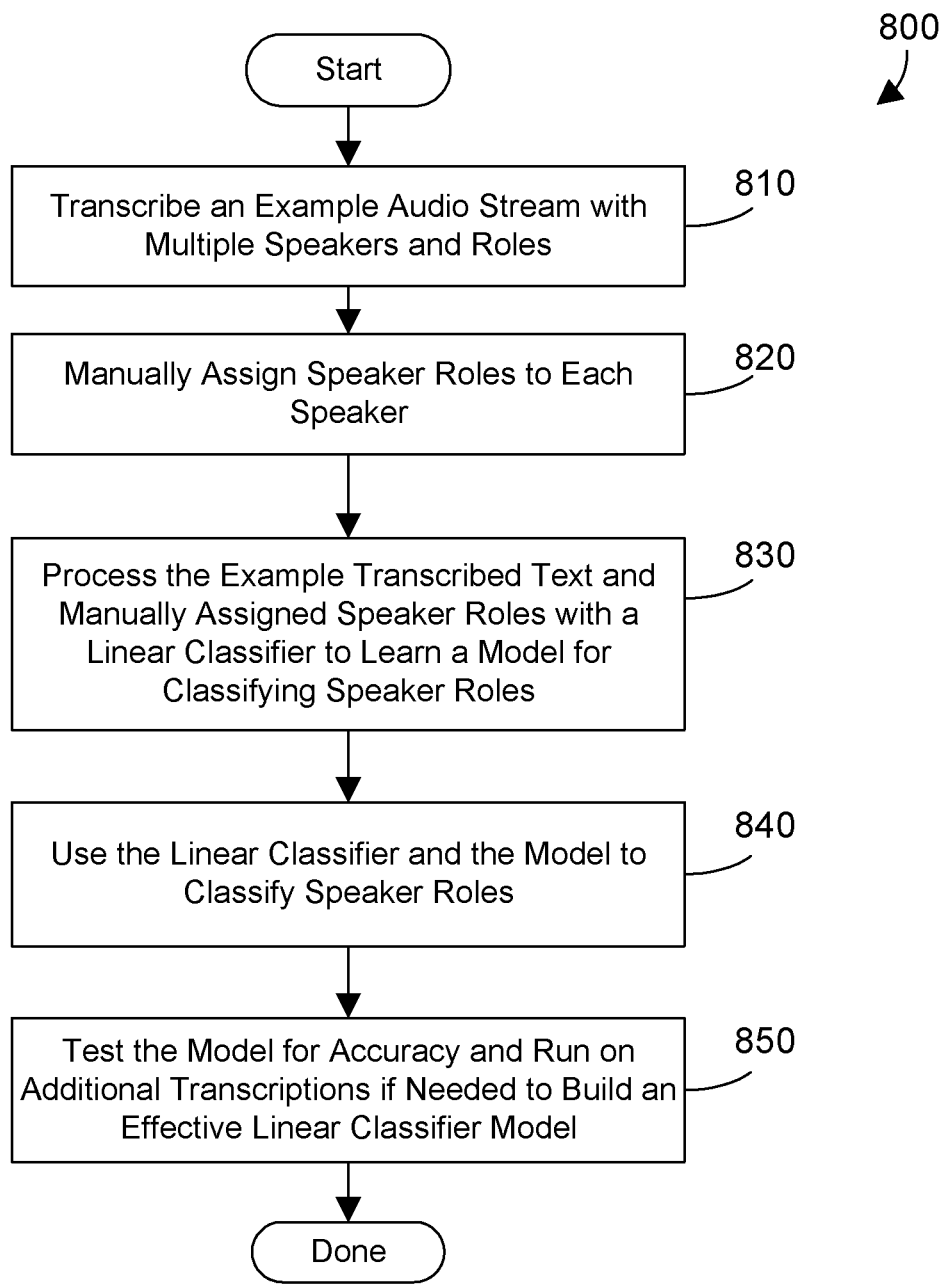
FIG. 8 is a flow diagram of another specific method for step 620 in FIG. 6.

FIG. 8 shows a method 800 which is another suitable method to run text analytics over an entire set of transcriptions for each RTP stream and classify each speaker with a given speaker ID to a speaker role. Method 800 thus shows another method for performing step 620 in method 600 in FIG. 6. First, transcribe an example audio stream with multiple speakers and roles (step 810). Manually assign speaker roles to each speaker (step 820). Input the example transcribed text and manually assigned speaker roles to a linear classifier so the linear classifier can learn a model for assigning speaker roles (step 830). Test the model for accuracy and run additional transcriptions if needed to build an effective linear classifier (step 840). Method 800 is then done.

The disclosure and claims herein relate to a system and method for efficiently using text analytics and diaritization to identify speakers by their role in conversation. The speaker role can be used to efficiently monitor conversations in a data stream to provide additional services in a call center such as a transcript of conversations with identified roles or enhanced customer support.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a stream analyzer residing in the memory and executed by the at least one processor that monitors multiple real-time transport protocol (RTP) streams associated with a conversation having speakers with unknown speaker roles;
the stream analyzer further comprising a streams controller residing in the memory and executed by the at least one processor that runs diaritization on the RTP streams to identify speakers and runs transcription on the RTP streams to output text corresponding to speech of the speakers;
wherein the streams controller uses the speakers identified by the diaritization and runs text analytics on the output text of the transcription to identify speakers in the RTP streams by their role;
where there is only a single speaker on each RTP stream, the streams controller associates a speaker in each RTP stream with a synchronization source identifier (SSRC) and after the speakers are identified and associated with an SSRC, discontinues diaritization of the RTP streams to preserve computer resources while continuing to identify the speakers in the RTP streams by their associated SSRC and outputs the speaker role to provide additional services.

2. The apparatus of claim 1 wherein the streams controller uses the diaritization to associate an identified speaker with a speaker identification and then runs text analytics over a set of transcribed text from the conversation to classify a speaker with a given speaker identification to a speaker role.

3. The apparatus of claim 2 wherein the streams controller repeats running text analytics on new transcribed text to increase confidence in the speaker role for the speaker.

4. The apparatus of claim 2 wherein the streams controller continues to monitor transcription of the RTP streams by the speaker identification.

5. The apparatus of claim 2 wherein the text analytics used by the streams controller comprises comparing terms and phrases used by the speaker in the set of transcribed text to a table of terms and phrases, and classifying the speaker with the speaker role where terms and phrases spoken by the speaker match terms and phrases for a speaker role in the table.

6. The apparatus of claim 2 wherein the text analytics used by the streams controller comprises transcribing an example audio stream, manually assigning speaker roles to each speaker in the audio stream, processing the transcribed text and manually assigned speaker roles with a linear classifier to learn a model for classifying speaker roles, and using the linear classifier and the model to classify the speaker role.

7. The apparatus of claim 1 wherein the streams controller ties RTP streams of the conversation from a telephone call together using an internet protocol (IP) address in an RTP packet of the RTP stream.

* * * * *